(12) United States Patent
Dika

(10) Patent No.: US 7,117,804 B2
(45) Date of Patent: Oct. 10, 2006

(54) SEEDING APPARATUS

(76) Inventor: Michael Dika, Box 117, Ryeroft, Alberta (CA) T0H 3A0

( * ) Notice: Subject to any disclaimer, the term of this patent is extended or adjusted under 35 U.S.C. 154(b) by 0 days.

(21) Appl. No.: 11/111,812

(22) Filed: Apr. 22, 2005

(65) Prior Publication Data

US 2005/0241553 A1   Nov. 3, 2005

(30) Foreign Application Priority Data

May 3, 2004   (CA) ..................... 2466098

(51) Int. Cl.
*A01C 5/00*   (2006.01)
(52) U.S. Cl. ..................... 111/99
(58) Field of Classification Search ............. 111/89, 111/99; 172/95, 101

See application file for complete search history.

(56) References Cited

U.S. PATENT DOCUMENTS

| 2,127,510 A | * | 8/1938 | Fulton ............... 111/89 |
| 2,193,575 A | * | 3/1940 | Seth ................ 172/22 |
| 3,186,495 A | | 6/1965 | Gijzenberg |
| 3,240,175 A | | 3/1966 | Clow |
| 3,394,667 A | * | 7/1968 | Lasch ............... 111/118 |
| 3,670,670 A | | 6/1972 | Vissers |
| 4,106,414 A | * | 8/1978 | Vastag .............. 111/200 |
| 4,122,784 A | | 10/1978 | Joswig |
| 4,338,871 A | | 7/1982 | van der Lely |
| 4,901,655 A | | 2/1990 | Magda |
| 5,611,291 A | | 3/1997 | Pogue |
| 6,273,197 B1 | | 8/2001 | Marlow |

FOREIGN PATENT DOCUMENTS

GB   2 233 537   1/1991

* cited by examiner

*Primary Examiner*—Christopher J. Novosad
(74) *Attorney, Agent, or Firm*—Ryan W. Dupuis; Michael R. Williams; Adrian D. Battison

(57) ABSTRACT

A seeding apparatus plants seed in the ground with a minimum soil disturbance. A base plate is provided which is supported for sliding movement along the ground and which includes a plurality of seed apertures formed therein. A metering system meters seed from a seed hopper to the seed apertures. Reciprocating push-rods subsequently push the seed through the seed aperture to a prescribed depth below a surface of the ground. As the seed remains in contact with moist soil below the surface of the ground, rapid germination results without concern for seed runoff when seeding sloped surfaces.

15 Claims, 3 Drawing Sheets

SEEDING APPARATUS

FIELD OF THE INVENTION

The present invention relates to an apparatus and method for planting seed into the ground.

BACKGROUND

There are many applications where it is desirable to have uniform and full grass covering the ground. Playing surfaces in many sports in particular require uniform density of grass sprouts for proper performance thereon. It is common practice therefore to seed thinning areas on various playing surfaces, for example golf greens and the like so as not to interfere with playing of the sport thereon. Due to the high use of the playing surfaces in these instances, it is desirable to seed thinning patches with a minimum disturbance of the soil so as to minimize cost resulting from inactivity on the playing surface.

There are many seeding machines in the agricultural marketplace, but most are disc or hoe-type implements which cut or route a slot in the soil into which the seed is dropped. These types are not suitable for turf grass seeding because excessive disturbing of the prepared seed bed. Also it is not possible to make the rows close enough together so that quick fill in is possible. In conventional turf grass seeding, a smooth seed bed is first prepared. A convention drop seeder is then used to scatter grass seed evenly on the surface. Thereafter frequent watering to keep the soil moist ensures that the seed will germinate and thrive. The frequent watering however tends to wash the seed down off the slopes and leaves bare spots which must be reseeded. Furthermore without constant attention with frequent watering, there is a tendency for the soil to dry out a surface where the seed is deposited so that the seed cannot germinate.

Among the following patents, U.S. Pat. No. 3,186,495 to J. Gijzenberg, U.S. Pat. No. 3,240,175 to W. V. Clow, U.S. Pat. No. 3,670,670 to Vissers, U.S. Pat. No. 4,122,784 to Joswig, U.S. Pat. No. 4,38,871 to van de Lely, U.S. Pat. No. 4,901,655 to Magda, U.S. Pat. No. 5,611,291 to Pogue, U.S. Pat. No. 6,273,197 to Marlow and UK patent 2,233,537 to SisIs Equipment (Macclesfield) Limited, various examples of seed related devices are described, however in each instance, considerable soil disturbance results. Furthermore each of the devices is generally complex involving numerous interacting moving parts requiring costly and time consuming maintenance.

SUMMARY

According to one aspect of the present invention there is provided a seeding apparatus comprising:

a base plate supported for sliding movement along the ground, the base plate including a plurality of seed apertures formed therein;

a seed hopper for containing seed therein;

a metering system for metering seed from the seed hopper to the seed apertures in the base plate; and a push rod associated with each seed aperture having a bottom free end which is movable between a raised position above the base plate and a lowered position below the base plate in which the push rod extends through the respective seed aperture.

According to a second aspect of the present invention there is provided a method of planting seed in the ground comprising:

providing a seeding apparatus comprising a base plate including seed apertures formed therein and a push rod associated with each seed aperture having a bottom free end which is movable between a raised position above the base plate and a lowered position below the base plate in which the push rod extends through the respective seed aperture;

sliding the base plate along the ground;

metering seed to the seed apertures;

reciprocating the push rods to embed seed into the ground below a surface of the ground each time at least one of the push rods is displaced from the raised position to the lowered position.

The use of push rods in co-operation with seed apertures in a base plate ensures that seed is deposited beneath a surface of the soil so as to remain in contact with the moist sub-surface earth to speed up the germination process. The embedded seed is further protected from runoff problems associated with simply depositing seed on the surface. The base plate in co-operation with the seed apertures formed therein acts to minimize soil disturbance so that the surface of the soil shows no visible sign of seeding immediately after use and can immediately be used as a playing surface in various sports.

Each rod preferably includes a narrow free end portion of reduced diameter which is received through the respective seed aperture so that a main portion of the rod can remain thicker and stronger while the end portion is small enough to reduce visible signs of soil disturbance.

A bottom free end of each rod and the respective seed aperture preferably have a mating cross section and are substantially equal in diameter.

Each seed aperture may include a funnel opening tapering downwardly and inwardly to a bottom end at the base plate for guiding seed to the aperture.

The seed hopper and metering system may be supported above the seed apertures so as to be suitably arranged for metering seed to the seed apertures by gravity feed.

The push-rods may all be supported on a common carrier for movement together between the raised and lowered positions with each rod being slidably supported at plural vertically spaced positions therealong.

Biasing means are preferably provided to urge the push-rods upwardly against a cam mechanism which may engage the rods to reciprocate the rods between raised and lowered positions thereof against the force of the biasing means.

The rods may extend below the base plate in the lowered position between ⅛ of an inch and 1 inch.

There may be provided a common rotary input to the metering system for metering seed to all of the seed apertures.

The metering system may be driven by rolling movement of the seeding apparatus along the ground.

The seed apertures are preferably aligned in at least one row oriented transversely to a working direction of the apparatus. In the illustrated embodiment, only a single row is provided, but others rows may be provided with increasing complexity of the operating mechanism.

The base plate may include an upwardly inclined portion along at least one longitudinally extending edge oriented transversely to a working direction of the apparatus for ease of riding the base plate slidably along the ground.

A wheeled cart may support the base plate, seed hopper, metering system and push-rods thereon, along with an integral motor for driving reciprocation of the push-rods between the raised and lowered positions.

BRIEF DESCRIPTION OF THE DRAWINGS

In the accompanying drawings, which illustrate an exemplary embodiment of the present invention.

DETAILED DESCRIPTION

Figure 1:
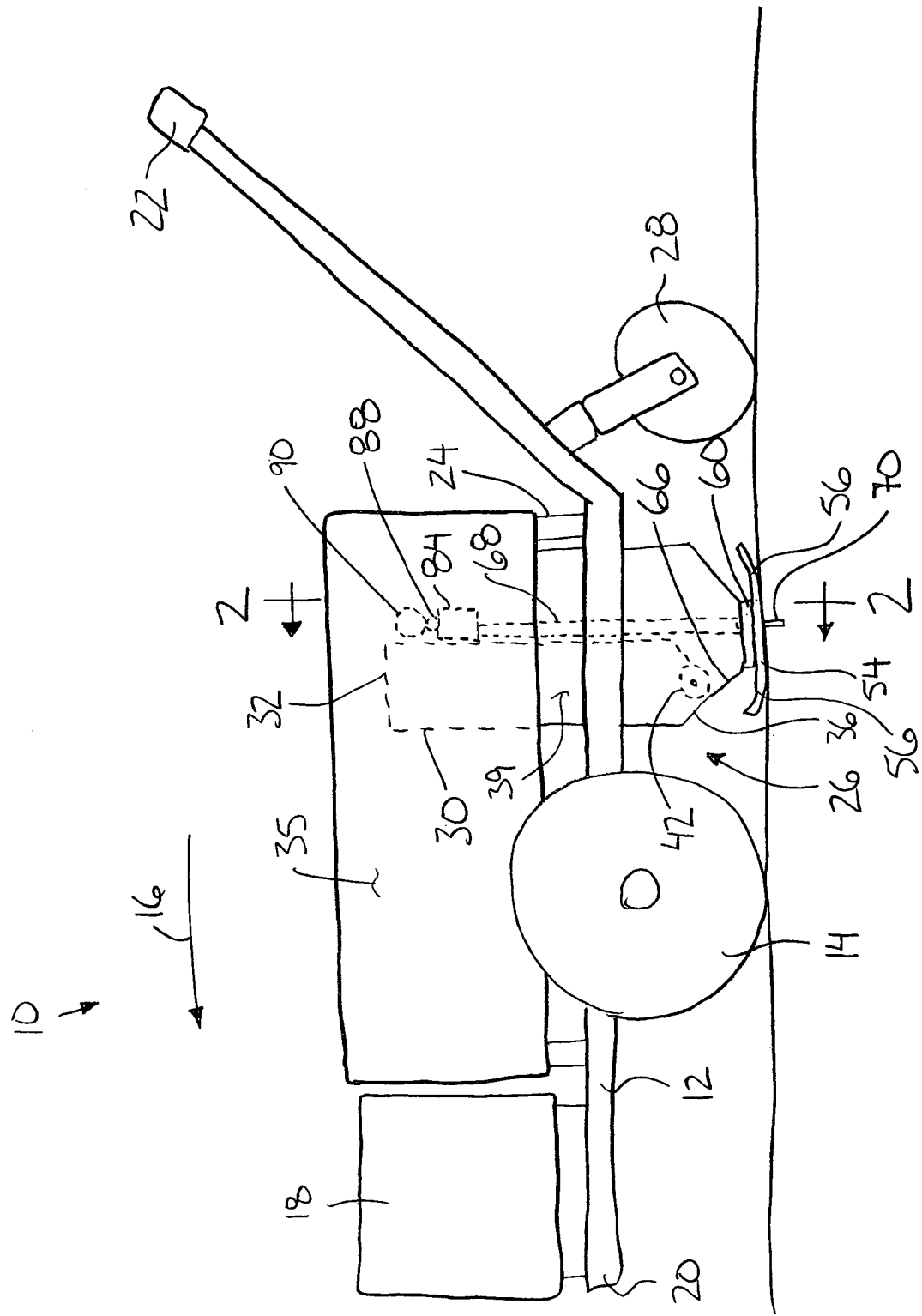
FIG. 1 is a schematic side elevational view of the seeding apparatus.
Figure 2:
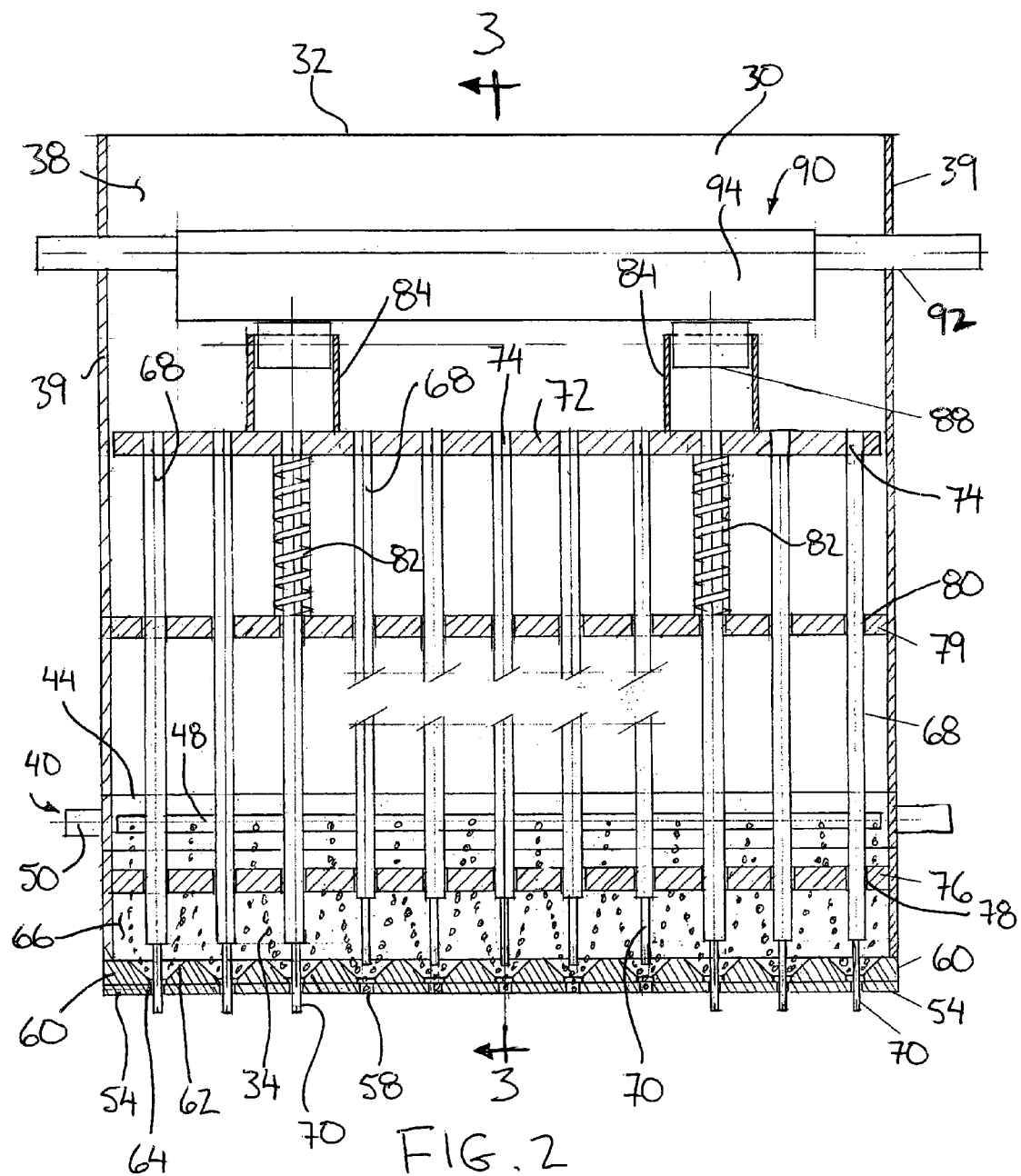
FIG. 2 is a sectional view along the line 2—2 of the seed mechanism portion of the seeding apparatus in which centrally located rods are shown in the raised position and outermost rods are shown in the lowered position.
Figure 3:
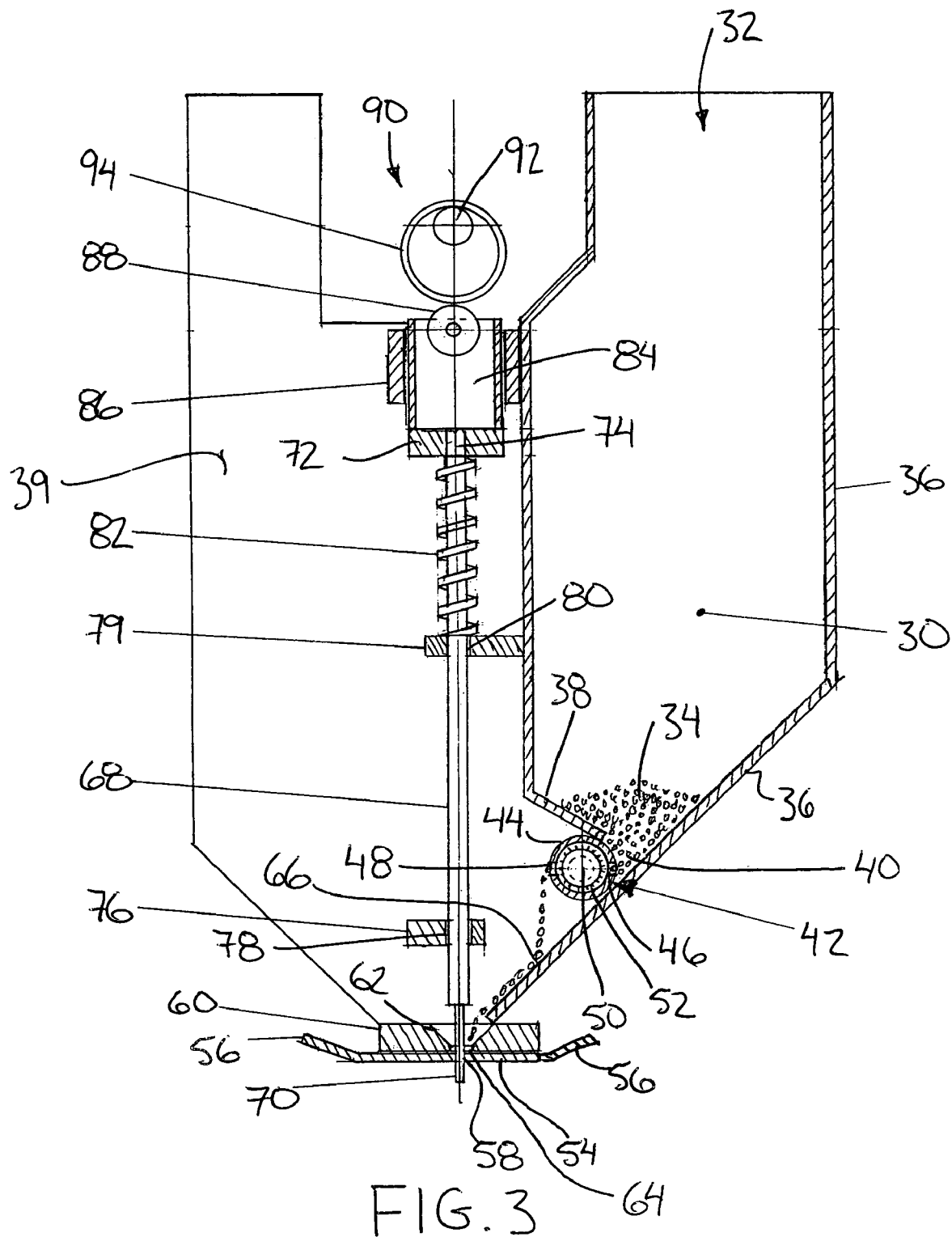
FIG. 3 is a sectional view along the line 3—3 of the seed mechanism of FIG. 2 with the rods shown in the lowered position.

Referring to the accompanying drawings, there is illustrated a seeding apparatus generally indicated by reference numeral 10. The apparatus 10 is particularly suited for seeding turf with a minimum soil disturbance for ready use of the turf immediately after seeding, for example for golf greens and the like where soil disturbance is particularly undesirable.

The apparatus 10 generally comprises a cart including a frame 12 which is supported on a pair of main wheels 14 for rolling movement in a working direction 16. While the working direction 16 is indicated by an arrow in the accompanying figures, the apparatus is readily operable in either direction. The frame includes a supporting surface for an engine 18 adjacent a front end 20 and operator handle bars 22 adjacent a rear end 24. Suitable operator controls are mounted on the handle bars 22 so that an operator driving the cart can control all of the functions of the cart with their hands on the handle bars.

The main wheels 14 are centrally located between the front and rear ends of the frame for balancing weight of the apparatus 10 thereon. A seeding mechanism 26 is supported on the frame 12 rearwardly of the wheels 14 adjacent the rear end 24. The rear end is further supported for rolling movement along the ground by a rear castor wheel 28 connected to the frame 12 below the handle bars 22.

A seed hopper 30 is supported on the frame adjacent the seeding mechanism 26 for supplying seed thereto. The hopper 30 spans a full width of the seeding apparatus between the wheels 14 while being narrower in the working direction. The hopper 30 is enclosed on all sides but includes an open top end 32 for placing seed 34 therein. A suitable cover 35 is provided on the cart in use for enclosing the top end of the hopper. A front wall 36 and a rear wall 38 of the hopper span between opposed vertically oriented side plates 39 which support the hopper on the frame. The front wall 36 and the rear wall 38 of the hopper taper inwardly toward one another adjacent the bottom end of the hopper to meet at a laterally extending apex opening 40 extending horizontally generally perpendicularly to the working direction.

A metering system 42 spans laterally across the apex opening 40 a full width of the hopper to control the dispensing of seed through the apex opening. The metering system comprises a laterally extending tube 44 extending horizontally across the opening 40 perpendicular to the working direction. An inlet slot 46 extends longitudinally along one side of the tube 44 a full length of the hopper in communication with the apex opening 40. An opposing outlet slot 48 similarly spans a full width of the hopper for dispensing a metered amount of the seed therefrom. The metering system 42 is supported on the side plates 39 to span therebetween.

A rotary metering member 50 is supported within the tube 44 in the form of a rod having a diameter which is less than the interior diameter of the tube 44 to define an annular space sufficiently large to receive passage of seed therethrough. A plurality of radial partitions 52 extend the full length of the metering member 50 to partition the annular space between the member 50 and the interior diameter of the tube 44. Seed is sequentially gathered within the partitioned spaces between adjacent radial partitions 52 as the partitions are rotated past the inlet slot 46 in communication with the interior of the hopper through the apex opening 40. When the partitions rotate past the outlet slot 48 the seed is deposited therefrom in a metered quantity dependent upon the rotation speed of the rotary metering member 50 by gravity feed.

Below the metering system, a base plate 54 is provided having a rigid flat bottom which is generally rectangular in shape. The base plate is supported to span between respective bottom ends of the side plates 39. Front and rear longitudinally extending edges 56 of the base plate, which are oriented perpendicularly to the working direction, extend upwardly and outwardly at an incline to assist the plate in riding over minor obstacles on the ground. Any fasteners used to secure the base plate 54 to the frame of the apparatus are embedded into the plate from below so as to be flush mounted with the bottom surface of the plate.

The base plate 54 includes a row of seed apertures 58 formed therein. The apertures are formed in a single row spaced approximately ¾ of an inch from one another along a single line oriented perpendicular to the working direction. Each aperture extends vertically through the plate when the plate lies horizontal in its normal use position.

A seed receiver 60 is supported directly adjacent a top side of the plate for directing seed into the seed apertures 58. The receiver 60 generally comprises a solid block of material abutted against a top side of the plate and including a plurality of funnel-shaped openings 62 therein. Each of the seed apertures 58 includes a funnel opening 62 directly thereabove in communication therewith. The funnel opening 62 generally has a large opening in a top side of the receiver and tapers downwardly and inwardly in all directions towards a central bottom apex 64 at the seed aperture 58 in the plate. The receiver supports the base plate on the side plates.

The seed hopper is placed slightly ahead of the base plate and seed receiver, spaced thereabove. The front wall of the hopper extends past the metering system to the top of the seed receiver to define a guide portion 66 spanning between the metering system and the top side of the funnel openings 62 so that seed deposited from the outlet slot 48 of the metering system falls into the holes in the seed receiver 60. The guide portion is sloped downwardly and rearwardly at an approximately 45° incline so that seed is fed into the seed apertures 58 by gravity alone.

A series of push-rods 68 are supported above the row of seed apertures 58 for reciprocating movement relative to the frame. One of the push-rods 68 is vertically aligned above each of the seed openings 58. Each rod is a rigid member having a round cross section with a diameter which is greater than the diameter of the seed apertures 58 for added strength thereof. A needle portion 70 is provided at the bottom free end of each rod which is reduced in diameter in relation to the main portion of the rod so that the diameter of the needle portion 70 is approximately equal to that of the seed aperture 58 and has a mating circular cross section therewith for slidably receiving the needle portion therethrough as the rods are reciprocated in relation to the frame.

A common carrier 72 is provided which supports all of the rods fixed thereon for vertical sliding movement in relation to the frame and the base plate supported on the frame. The rods are movable together between a raised position in which the needle portion at the bottom free end is supported above the plate and a lowered position in which the needle portion at the bottom free end of the rods extends through the respective seed apertures 58 to terminate spaced below the plate. The carrier 72 generally comprises a header spanning perpendicularly to the working direction horizontally across the width of the frame. The upper end 74 of each rod is threadably received within the header forming the carrier to selectively replace individual rods if damaged.

A lower guide member 76 spans between the side plates 39 so as to be fixed in relation to the frame spaced slightly above the base plate. The lower guide member 76 includes a plurality of holes 78 formed therein having a diameter which is similar to the outer diameter of the rods for slidably receiving the rods therethrough above the needle portion 70 thereof.

A middle guide 79 similarly spans between the side plates 39 so as to be fixed in relation to the frame spaced above the lower guide 76. Suitable holes 80 are provided at spaced positions therealong for slidably receiving the rods therethrough. A pair of springs 82 are provided at spaced apart locations about a respective pair of the push-rods 68 so as to each be compressed between the middle guide 79 and the header defining the carrier 72 of the rods for urging the rods upwardly away from the middle guide and accordingly away from the base plate.

The carrier 72 includes a pair cam followers 84 mounted thereon at spaced positions towards opposing lateral ends of the header. The cam followers each include a square channel fixed on the carrier which is slidably received through an upper guide 86 fixed on the frame between the side plates 39. A roller 88 is rotatably supported within each of the channels forming the cam followers 84 for rotation about a horizontally extending lateral access perpendicular to the working direction.

A cam shaft 90 is rotatably supported on the frame for rotation about a longitudinal axis thereof which is parallel to the axis of the rollers 88, perpendicular to the working direction. The cam shaft includes a rod portion 92 concentric with the axis of rotation which is rotatably supported within respective bearings at opposing ends thereof on the frame. An eccentric tube 94 is supported about a main portion of the rod between the ends thereof for engagement with the rollers 88. As the cam shaft is rotated about its respective longitudinal axis, the rollers roll along an outer surface of the eccentric tube 94 for following an up and down reciprocating movement with varying radial dimension of the eccentric tube at a point of contact with the rollers. The varying dimension of the cam shaft as it rotates acts against the springs 82 on the carrier 72 for selectively displacing the rods downwardly into the lowered position in which the needle portions extend through the respective seed apertures 58.

The cam shaft 90 is operated by connection to the rotary output of the engine 18 supported on the front end of the frame. Engine speed therefore controls the rate of rotation of the cam shaft and accordingly the rate of reciprocation of the rods between the respective raised and lowered positions thereof. The rotating metering member 50 of the metering system is coupled to the main wheels 14 supporting the seeding apparatus 10 for rolling movement along the ground so that the speed which the apparatus is pushed along the ground affects the rate of rotation of the wheels, and thus the rate or rotation of the rotary metering member 50.

When the apparatus is driven more quickly across the ground to cover a larger area within a prescribed amount of time, the metering system will rotate more quickly to distribute more seed and thus compensate for the larger area being covered. Similarly if an operator where to momentarily pause and no movement along the ground resulted, the metering system would similarly halt and no further seed would be seeded at a given location until the apparatus is again displaced in rolling movement along the ground.

The apparatus operates when the base plate is slidably displaced along the ground and the engine is operated to reciprocate the rods. Sliding movement of the base plate results in rotation of the rotary metering member 50 as described above so that seed is metered from the hopper out of the outlet slot 48, along the guide portion 66 to the funnel openings 62 in the seed receiver 60. The seed received within each funnel opening surrounds the respective rod reciprocating therein so that upon each displacement of the rod into the raised position in which the needle portion is above the plate, seed is gravity fed by the funnel opening into the seed aperture 58 so that subsequent return of the needle portion of the push-rod engages the seed to push the seed into the earth below a surface of the ground a depth in the range of ⅛ of an inch to 1 inch deep as previously set when configuring the apparatus. Each needle portion 70 of the rods includes a blunt bottom end which suitable for pushing the seed through the ground. In further embodiments, the bottom end of each needle portion may be concave to further ensure that individual seeds are retained on the end of the needle portion as it is pushed into the ground on each downward moving reciprocation from the raised position to the lowered position.

As described herein, the seeding apparatus is a small wheeled cart which can be displaced along the ground by a single operator. The unit weighs approximately 300 lbs., has a length of 76 inches, a width of 33 inches, an approximate height of 24 inches and a handle height of 32 inches. The engine is coupled to the main wheels for driving movement of the apparatus across the ground. A seeding path of 12 inches can be penetrated into the ground at a rate of approximately 33 feet a minute with 16 rows as ¾ inch spacing being provided. In further embodiments however, any desired width can be provided for seeding larger or smaller areas. The seed hopper has a capacity of approximately 10 litres.

The apparatus is primarily designed to re-seed winter killed or diseased patches on golf greens quickly and efficiently. The apparatus pokes seed through growing of dead grass and brings it into contact with moist soil for quick germination. The rows are spaced three quarters of an inch apart for quick fill in. The apparatus can also be used to rejuvenate tired old greens by seeding new seed through existing greens.

There are 256 perforations per square foot for considerable thickening of existing grass while permitting the greens to be playable as soon as seeding is finished.

A one foot wide machine can totally under seed a 4000 sq. ft. green in three hours, whereas a two foot wide machine can do it in one and a half hours.

The seeding apparatus is essentially a plate that slides on top of the green as it is driven along the ground. In this plate are a series of holes at right angles to the direction of travel. Above this plate is a series of vertical push rods which match the holes. These rods or needles reciprocate up and down through the holes and penetrate into the ground an adjustable depth.

A metering device feeds seed to the holes at a controlled rate. As the needles penetrate, they poke seed into the moist ground for quick germination.

The concept of planting grass seeds automatically at the optimum seeding depth has not been possible in the prior art with a minimum of soil disturbance as achieved with the present invention. The adjustable hopper seed drop mechanism can be adjusted for different seeding rates of many types of grass seed used in the golf course industry from Kentucky Bluegrass to Creeping Bentgrass. As well as having the adjustable seed rate component, the underseeding tines used to plant the seeds at optimal depth cast be adjusted.

For the process of overseeding or re-establishing turf on greens, conventionally a process of seedbed and soil preparation is needed, however with the seeding apparatus of the present invention, under-seeding can be done very effectively with minimal seedbed preparation.

One of the main factors in the successful germination of a grass seed is seed to soil contact. This is because of the moisture holding capacity of soil. With the seeding apparatus described herein, seed to soil contact is optimal, as the seed is planted at the optimum depth for its growth with soil contact coming from every angle.

With conventional overseeding, it has always been difficult to get even distribution and germination of grass seed on areas with slope. Conventionally with overseeding comes frequent watering intervals which is done to ensure the seed bed is moist at all times to ensure proper germination of the grass seed. With watering on slopes that have been overseeded, the grass seed tends to wash down to the low areas leaving patches of seeded area bare with no grass plants to fill in the area. With the present invention, planting grass seed on slopes can be done just as easily as on flat ground. The seed is placed at its optimal depth, and therefore will not be washed away anywhere near to the extent as conventional overseeding would.

The seeding apparatus described herein plants seeds evenly at the desired rate with no thin areas being noticeable. As well as being an effective delivery of seed to the soil, the tines also help to alleviate soil compaction issues as wall as aerating the soil in the process.

While one embodiment of the present invention has been described in the foregoing, it is to be understood that other embodiments are possible within the scope of the invention. The invention is to be considered limited solely by the scope of the appended Claims.

The invention claimed is:

1. A seeding apparatus comprising:
   a base plate supported for sliding movement along the ground, the base plate including a plurality of seed apertures formed therein;
   a seed hopper for containing seed therein;
   a metering system arranged to control dispensing of seed from the seed hopper and arranged to deposit the seed in a metered quantity to the seed apertures in the base plate;
   a push rod associated with each seed aperture having a bottom free end which is movable between a raised position above the base plate and a lowered position below the base plate in which the push rod extends through the respective seed aperture; and
   biasing means arranged to urge the push-rods upwardly against a cam mechanism which engages the rods to reciprocate the rods between the raised and lowered positions thereof against the force of the biasing means.

2. The apparatus according to claim 1 wherein the bottom free end of each rod and the respective seed aperture are substantially equal in diameter.

3. The apparatus according to claim 1 wherein each seed aperture includes a funnel opening tapering downwardly and inwardly to a bottom end at the base plate.

4. The apparatus according to claim 1 wherein the seed hopper and metering system are supported above the seed apertures and are suitably arranged for metering seed to the seed apertures by gravity feed.

5. A seeding apparatus comprising:
   a base plate supported for sliding movement along the ground;
   a plurality of seed apertures formed in the base plate;
   a seed hopper for containing seed therein;
   a metering system arranged to control dispensing of seed from the seed hopper and arranged to commonly deposit the seed only in a metered quantity to the base plate; and
   a push rod associated with each seed aperture having a bottom free end which is movable between a raised position above the base plate and a lowered position below the base plate in which the push rod extends through the respective seed aperture;
   the bottom free end of the push rods and the seed apertures associated therewith being substantially equal in diameter;
   each seed aperture including a funnel opening tapering downwardly and inwardly to a bottom end at the seed aperture in the base plate through which a respective one of the push rods is selectively received;
   each funnel opening surrounding the respective push rod as the push rod reciprocates between the raised and lowered positions; and
   each funnel opening being arranged to feed the metered quantity of seed metered by the metering system to the respective seed aperture by gravity feed responsive to displacement of the respective push rod into the raised position.

6. The apparatus according to claim 5 wherein each rod includes a narrow free end portion of reduced diameter which is received through the respective seed aperture.

7. The apparatus according to claim 5 wherein a bottom free end of each rod and the respective seed aperture have a mating cross section.

8. The apparatus according to claim 5 wherein biasing means are provided to urge the push-rods upwardly against a cam mechanism which engages the rods to reciprocate the rods between the raised and lowered positions thereof against the force of the biasing means.

9. The apparatus according to claim 5 wherein the rods extend below the base plate in the lowered position between ⅛ of an inch and 1 inch.

10. The apparatus according to claim 5 wherein there is provided a common rotary input to the metering system for metering seed to all of the seed apertures.

11. The apparatus according to claim 5 wherein a rate of the metering system is dependent upon a speed of rolling movement of the seeding apparatus along the ground.

12. The apparatus according to claim 5 wherein the seed apertures are aligned in at least one row oriented transversely to a working direction of the apparatus.

13. The apparatus according to claim 5 wherein the base plate includes an upwardly inclined portion along at least one longitudinally extending edge oriented transversely to a working direction of the apparatus.

14. The apparatus according to claim 5 wherein a wheeled cart supports the base plate, seed hopper, metering system and push-rods thereon and wherein an integral motor is supported on the cart for driving reciprocation of the push-rods between the raised and lowered positions.

15. The apparatus according to claim 5 wherein the seed hopper and metering system are supported above the seed apertures and are suitably arranged for metering seed to the seed apertures by gravity feed.

\* \* \* \* \*